United States Patent
Liu et al.

(10) Patent No.: US 6,238,926 B1
(45) Date of Patent: *May 29, 2001

(54) PARTIAL INTERESTERIFICATION OF TRIACYLGLYCEROLS

(75) Inventors: Linsen Liu, Minnetonka; Daniel Scott Lampert, Chaska, both of MN (US)

(73) Assignee: Cargill, Incorporated, Deephaven, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,755

(22) Filed: Sep. 17, 1997

(51) Int. Cl.[7] ............................. G01N 21/25; A23D 9/02; C11B 3/06
(52) U.S. Cl. .................... 436/37; 436/71; 554/30; 426/417
(58) Field of Search .................. 252/309; 426/601, 426/607, 417; 516/24, 29; 554/30; 436/37, 71

(56) References Cited

U.S. PATENT DOCUMENTS

| | | | |
|---|---|---|---|
| 2,921,855 | * 1/1960 | Melnick et al. | 426/607 |
| 3,353,964 | * 11/1967 | Seiden | 426/607 |
| 3,870,807 | 3/1975 | Baltes | 426/417 |
| 3,900,503 | 8/1975 | McNaught | 426/417 |
| 4,410,557 | * 10/1983 | Miller | 426/607 |
| 4,482,576 | 11/1984 | Boot et al. | 426/603 |
| 4,567,056 | 1/1986 | Schmidt | 426/607 |
| 4,610,889 | 9/1986 | Schmidt | 426/602 |
| 4,789,554 | * 12/1988 | Scavone et al. | 426/601 |
| 4,888,196 | 12/1989 | Ehrman et al. | 426/601 |
| 5,000,975 | * 3/1991 | Tomarelli | 426/607 |
| 5,055,410 | * 10/1991 | Blumenthal et al. | 436/60 |
| 5,288,512 | 2/1994 | Seiden | 426/607 |
| 5,565,232 | 10/1996 | Wheeler et al. | 426/607 |
| 5,601,860 | * 2/1997 | Lien et al. | 427/72 |

FOREIGN PATENT DOCUMENTS 0 743 014 A1  11/1996  (EP) .

OTHER PUBLICATIONS

Shugar et al., Chemical technician's ready referenec handbook, (mcgraw–Hill, Inc., copyright 1981) pp. 70–707, 1981 Month unknown.*

Bailey's Industrial Oil and Fat Products, vol. 2, Fourth Edition, Edited by Daniel Swern (John Wiley & Sons, NY, NY, 1982) pp. 147–163, 292–293 and 433–434, 1982 Month unknown.*

Freeman, I. P. "Interesterification I. Change of Glyceride Composition During the Course of Interesterification"; *The J. American Oil Chemists Society*; 45: 6–456–460 (1968) Month unknown.

Hoffmann, G. "The Chemistry and Technology of Edible Oils and Fats and Their High Fat Products"; pp. 274; Academic Press, New York (1989), Month unknown.

(List continued on next page.)

*Primary Examiner*—Robert Dawson
*Assistant Examiner*—Daniel S. Metzmaier
(74) *Attorney, Agent, or Firm*—Merchant & Gould P.C.

(57) ABSTRACT

A process for modifying a triacylglycerol stock, such as a vegetable oil stock, to better control fluidity is provided. The process includes interesterifying the triacylglycerol stock in the presence of a basic catalyst while monitoring the absorbance of the reaction mixture. A modified triacylglycerol stock produced by partial interesterification as well as plastic spreads and water-in-oil emulsions which include the partially interesterified triacylglycerol stock are also provided.

30 Claims, 8 Drawing Sheets

OTHER PUBLICATIONS

Sreenivasan, B., "Enteresterification of fats", *J. of the Am. Oil Chemists' Society,* vol. 55, No. 11, Nov. 1978, pp. 796–805.

Dasgupta, J. et al., "A new method for glyceride composition determination by colorimetry", *J. of the Am. Oil Chemists' Society,* vol. 58, No. 5, 1981, Month unknown pp. 613–617.

Kellens, "Developments in Fat Modification Technology: Interesterification of Oils and Fats," *Workshop on Oils Interesterification,* (Nov. 1996).

Cho et al., "Physical Properties and Composition of Low Trans Canola/Palm Blends Partially Modified By Chemical Interesterification" *Journal of Food Lipids 1,* pp. 53–68 (1993), Month unknown.

D'Souza et al., "Chemical and Physical Properties of the Solid Fats in Commercial Soft Margarines," *JAOCS,* vol. 69, No. 12, pp. 1198–1205 (Dec. 1992).

Going, "Interesterification Products and Processes," *J. Am. Oil Chemists' Soc.,* vol. 44, pp. 414A–456A (Sep. 1967).

Marangoni et al., "Engineering Triacylglycerols: The Role of Interesterification," *Trends in Food Science & Technology,* vol. 6, pp. 329–335 (Oct. 1995).

Schmidt et al., "Preparation of Modified Fats From Vegetable Oil and Fully Hydrogenated Vegetable Oil By Randomization with Alkali Catalysts," *Food Chemistry,* vol. 55, No. 4, pp. 343–348 (1996), Month unknown.

Sreenivasan, "Interesterification of Fats," *J. Am. Oil Chemists' Soc.,* vol. 55, pp. 796–805 (Nov. 1978).

\* cited by examiner

FIG. 7
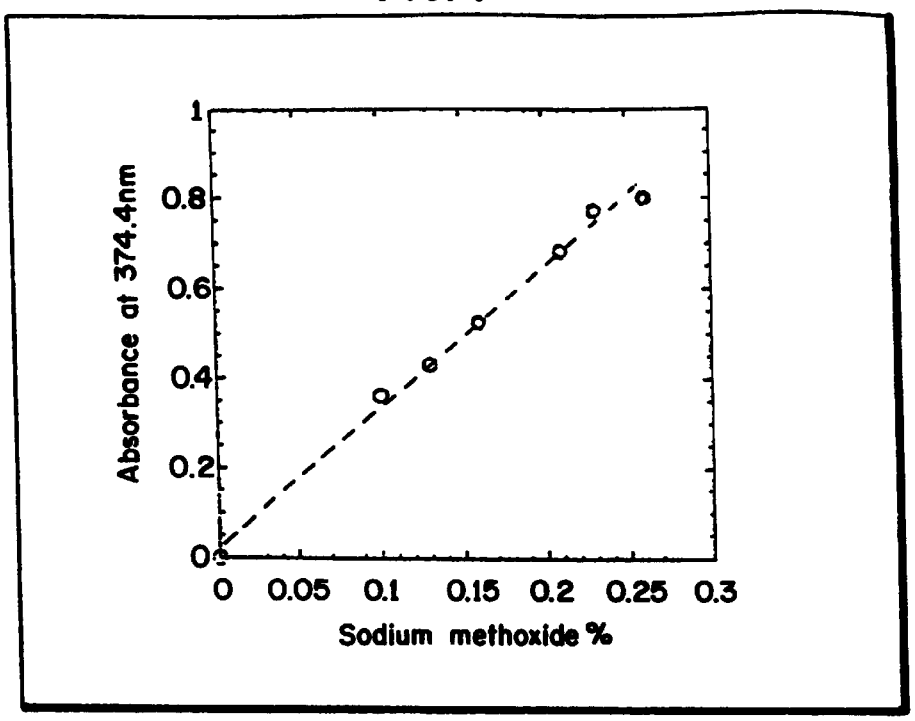
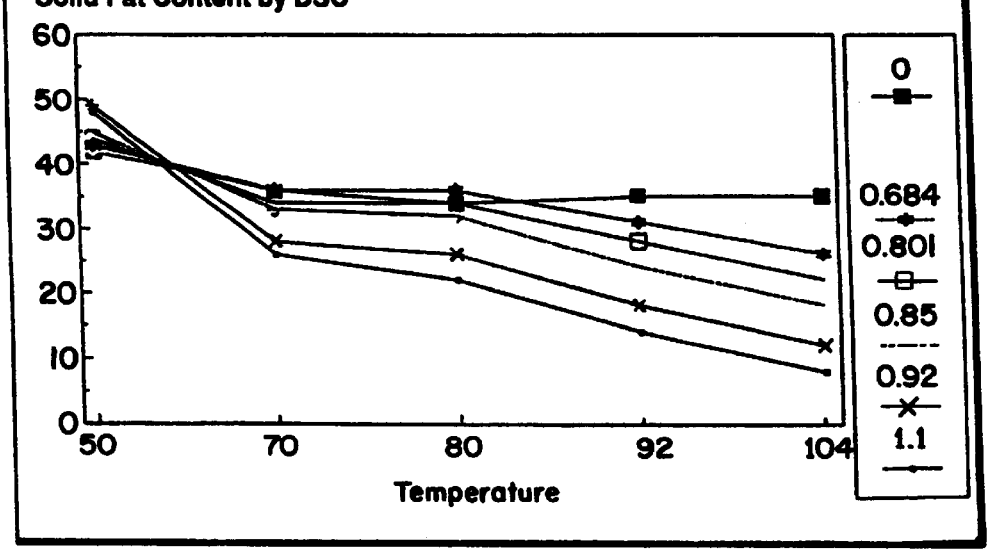
FIG. 8

PARTIAL INTERESTERIFICATION OF TRIACYLGLYCEROLS

BACKGROUND OF THE INVENTION

Fats and oils constitute an important component of human diet. They are a source of essential fatty acids such as linoleic, linolenic and arachidonic acids, and act as vehicles for vitamins as well as being a source of calories. Fats and oils are also widely used to enhance the texture and palatability of foods. Their varied uses necessitate a wide range of melting and crystallization properties.

The physical properties of a fat or oil are determined by (i) the chain length of the fatty acyl chains, (ii) the amount and type (cis or trans) of unsaturation present in the fatty acyl chains, and (iii) the distribution of the different fatty acyl chains among the triacylglycerols that make up the fat or oil. Those fats with a high proportion of saturated fatty acids are typically solids at room temperature while triacylglycerols in which unsaturated fatty acyl chains predominate tend to be liquid. Thus, hydrogenation of a triacylglycerol stock ("TAGS") tends to reduce the degree of unsaturation and increase the solid fat content and can be used to convert a liquid oil into a semisolid or solid fat. Hydrogenation, if incomplete, also tends to result in the isomerization of some of the double bonds in the fatty acyl chains from a cis to a trans configuration. Concerns over potential health implications of excessive consumption of fatty acids with trans double bonds (e.g., via margarines, shortenings or frying oils), has led to interest in the manufacture of low- or zero-trans spreadable fats.

By altering the distribution of fatty acyl chains in the triacylglycerol moieties of a fat, randomization can produce changes in the melting, crystallization and fluidity characteristics of a triacylglycerol stock. As well as leaving the overall degree of unsaturation (e.g., as measured by the Iodine Value) of a triacylglycerol stock unchanged, interesterification reactions typically do not generate additional trans double bonds.

With rising concerns over potential dietary effects of trans unsaturated fatty acids, interesterification provides an important alternative to partial hydrogenation in the production of plastic fats such as shortenings and margarines. Interesterification has been used in the oil industry for about a century, although the mechanism is still not well understood by the industry. Currently, interesterification is conducted with experimentally determined catalyst dosages and reaction times to reach a thermodynamic equilibrium (i.e., complete randomization) of the distribution of fatty acyl chains in a triacylglycerol stock. In practice, interesterifications are run with an excess of catalyst to ensure completion interesterification and the randomized product is then characterized by measurement of its physical properties, such as melting point and solid fat content. Herein the terms "randomization," "complete interesterification" and "complete randomization" are used interchangeably.

Interesterification has been demonstrated as a method to prepare plastic fats and modify fat crystals. Stock oils and fats commonly available as raw materials for interesterification have varying qualities and levels of purity. Because of this, the experimental dosage of catalyst required for initiating or completing interesterification can vary widely. In some cases, because of inactivation reactions, the catalyst dosage may be insufficient to initiate or complete interesterification, resulting in production delays and cost increases. To overcome this limitation, interesterification reactions are typically run using a substantial excess of catalyst. The physical properties and/or composition of the reaction product must be assayed upon completion of the interesterification. While this approach can ensure initiation and completion of the reaction, it does not permit the degree of control of the reaction rate necessary to reproducibly achieve a specific level of partial esterification.

SUMMARY OF THE INVENTION

The present invention relates to triacylglycerol stocks, such as triacylglycerol mixtures derived from oilseeds, rendered beef tallow, fish oil, palm oil or other plant or animal sources. It particularly concerns modifications of selected triacylglycerol stocks to provide products with preferred properties for use, for example in the preparation of plastic fats such as shortenings and margarine.

A process for modifying a triacylglycerol stock, such as a vegetable oil stock, to enhance its physical properties (e.g., hardness or fluidity) in a controlled manner is provided herein. The process includes interesterifying the triacylglycerol stock in the presence of a basic catalyst. The triacylglycerol stock turns a reddish brown color upon initiation of the interesterification reaction. There is a direct correlation between the absorbance of the reaction mixture and the degree of interesterification which has been achieved, i.e., the absorbance is a reflection of the degree of interesterification of the mixture. While throughout this application reference is made to measuring the absorbance of a reacting interesterification mixture, it should be understood that in practical terms the transmittance of the mixture could also be measured. Since the absorbance and transmittance of a sample are arithmetically related (Absorbance=log(1/Transmittance)), either value could be measured and the second value calculated from the measurement of the first value. Throughout this application, it is to be understood the phrase "determining the absorbance" encompasses any measurement which involves the determination of the intensity of light passing through a sample relative to the intensity of the incident light source. Due to reactions with impurities in the triacylglycerol stock which can consume and/or inactivate the catalyst, the amount of active catalytic species generated from a fixed amount of catalyst can vary widely over different lots of triacylglycerol stock. Thus, although the same amount of catalyst can give different amounts of interesterification with different lots of starting triacylglycerol stock, by determining the absorbance of the mixture formed by addition of the basic catalyst to the triacylglycerol stock, it is possible to predict and monitor the degree of interesterification (partial or complete randomization) which will occur. Thus, according to the present invention, the partial interesterification of a triacylglycerol stock may be carried out by forming a mixture which includes the triacylglycerol stock and a basic catalyst. As the mixture is allowed to react, the absorbance of the reacting mixture is determined. The absorbance may be monitored at selected time intervals or continuously as a function of time. The reaction is allowed to proceed until the absorbance of the mixture reaches a preselected value, thereby forming a partial interesterification product. Once the absorbance has reached the preselected value, the reaction is typically stopped by the addition of a quenching solution.

Herein, when reference is made to the term "triacylglycerol stock," the intent is to refer to a material comprising triacylglycerols, whether altered or not, derived from various plant, animal and synthetic sources, such as oil seed sources. The term at least includes within its scope: (a) such materials which have not been altered after isolation; (b) materials which have been refined, bleached and/or deodorized after isolation; (c) materials obtained by a process which includes fractionation of a triacylglycerol stock; (d) oils obtained from plant or animal sources and altered in some manner, for example through partial or complete hydrogenation; and (e) blends of any such materials. While the triacylglycerol stocks employed as starting materials in the present interesterification process may have been treated via a number of these processes, in most instances the starting triacylglycerol stock will have been bleached. "Bleaching" is a standard process used to remove color bodies from oils, typically via an adsorption/filtration process. It will be understood that the triacylglycerol stock typically includes a mixture of triacylglycerols, and a mixture of triacylglycerol isomers. By the term "triacylglycerol isomers", reference is meant to triacylglycerols which, although including the same esterified acid residues, may vary with respect to the location of the residues in the triacylglycerol. For example, a triacylglycerol stock, such as a vegetable oil stock, can include both symmetrical and unsymmetrical isomers of a triglyeride which includes two different fatty acyl chains (e.g., includes both stearate and oleate groups).

The starting material for the interesterification reaction may be a blend which includes one or more other esters in addition to triacylglycerol(s). For example, simple esters such as long chain alcohol esters of fatty acids and/or polyesters of sugars or sugar derivatives may be interesterified with a triacylglycerol stock.

Herein, the result of reacting a triacylglycerol stock, such as a vegetable oil stock, to interesterify the fatty acyl chains will be referenced as an "interesterification product." The term "interesterification product" includes within its scope practices which involve reacting the triacylglycerol stock to the extent that thermodynamic equilibrium (i.e., complete randomization) of the distribution of fatty acyl chains in a triacylglycerol stock has been substantially achieved, i.e., a "randomization product" is produced. As used herein the term, "interesterification product" also includes triacylglycerol stocks which have been reacted to an extent insufficient to achieve a complete thermodynamic distribution of fatty acyl chains, i.e., a "partial interesterification product." The partial interesterification product is typically a modified triacylglycerol stock which has been reacted to achieve a selected degree between about 5% and about 95% and, preferably, from about 20% and about 80% of reaction toward complete randomization (degree of interesterification) of the fatty acyl chains. As described herein, the degree of interesterification can be measured based on any of a variety of properties of the triacylglycerol stock. The partial interesterification product may be produced by a process which includes determining an absorbance of a mixture including the triacylglycerol stock and the basic catalyst; and allowing the mixture to react for a sufficient time and at a sufficient temperature to form the partial interesterification product. One example of a triacylglycerol stock which is particularly suitable for modification using this process is a triacylglycerol stock which is a blend of a hardstock component and a softstock component.

Plastic fats and edible products containing plastic fats, such as margarines and low fat spreads, are also provided herein. Such plastic fats may be produced by a process which includes blending a partially interesterified triacylglycerol stock with another triacylglycerol stock, e.g., a vegetable oil which has been refined, bleached and/or deodorized. The edible products may be produced by a process which includes emulsifying the plastic fat with an aqueous phase. As used herein, a "plastic fat" is semi-solid to solid, firm but not brittle, easily malleable, with no free oil visible. Plastic fats typically have a solid fat content of no higher than about 20% at 40° C. (104° F.).

The present invention also provides a method of monitoring an interesterification reaction. The method allows the amount of a basic catalyst employed to completely interesterify a triacylglycerol stock to be minimized. In many typical applications the method includes:

(A) adding an incremental amount of the basic catalyst to the triacylglycerol stock to form a catalyzed triacylglycerol stock;

(B) allowing the catalyzed stock to undergo an interesterification reaction until a measurable property of the triacylglycerol stock remains constant; and (C) measuring the absorbance of the catalyzed stock, typically at a wavelength between about 300 nm and about 500 nm, after the measurable property has attained the constant value.

The measurable property is one which depends on the molecular composition of the triacylglycerol stock and reaches its extreme values in the material prior to initiation of the interesterification reaction and after randomization has been achieved. After the interesterification has been allowed to proceed to the point where the measurable property remains constant, the absorbance of the mixture is determined. An additional incremental amount of the basic catalyst may be added to form a second catalyzed triacylglycerol stock. The second catalyzed triacylglycerol stock allowed to interesterify until the measurable property again attains a constant value and absorbance is then measured. As used herein, the measurable property is considered to no longer change (i.e., attained a constant value) when it does not vary by more than about 5% upon further heating for a period of up to about 1.0 hour at a temperature between 50° C. and 200° C. The repetition of these steps may be continued until the measurable property no longer changes with a subsequent addition of an incremental amount of the basic catalyst. The total amount of catalyst required to be added to attain the equilibrium value of the measurable property is referred to herein as the "minimum randomization amount" of catalyst.

Alternatively, the minimum randomization amount of catalyst may be determined by adding differing amounts of the catalyst to separate samples of the triacylglycerol stock. For each sample, the absorbance and the constant value of the measurable property achieved after allowing interesterification to proceed are then determined. As with the first alternative, the minimum randomization amount is the level of catalyst above which higher levels of catalyst do not produce any change in the measurable property.

BRIEF DESCRIPTION OF THE DRAWINGS

FIG. 7 is a graph showing the dependence of absorbance (at 374.4 nm) of a refined, bleached and deodorized triacylglycerol stock on the amount of sodium methoxide added.

FIG. 8 is a graph showing the solid fat contents of triacylglycerol stocks partially interesterified at different absorbencies.

DETAILED DESCRIPTION

Figure 1:
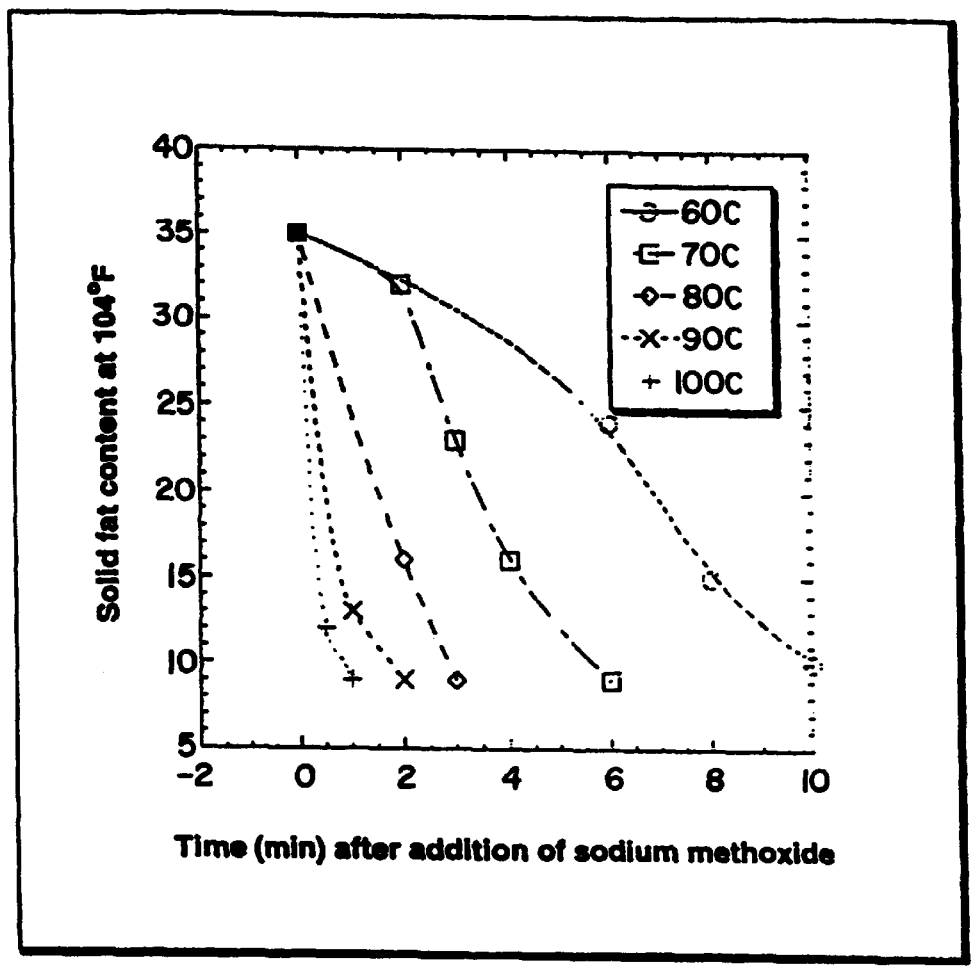
FIG. 1 is a graph showing the rate of interesterification of a triacylglycerol stock as a function of reaction temperature and reaction time as determined by the change of solid fat content at 40° C. (0.5 wt. % NaOMe).

The present method may be used to carry out the interesterification of triacylglycerol stocks in a controlled and reproducible manner. The present method may be utilized to provide interesterification products with enhanced fluidity and melting point characteristics as compared to their unmodified precursors. For example, the method allows the controlled modification of triacylglycerol stocks to produce fats having a reduced solid fat content without altering the trans content of the modified stock (relative to the trans content of the initial base stock). For example, the present method allows the reproducible production of partial interesterification products having increased solid fat content compared to a fully randomized product without modifying the trans content or the level of saturated fatty acids in the stock.

Although the structuring properties of partially interesterified blends may be slightly less pronounced than those of the corresponding randomized mixture, price considerations can favor the use of such partially interesterified mixtures. In comparison to either a fully interesterified version of a corresponding mixture of components or to a corresponding uninteresterified fat blend, a partially interesterified fat blend can also provide enhanced organoleptical characteristics.

A triacylglycerol stock includes triacylglycerol molecules (sometimes termed triglycerides). In general, triacylglycerols comprise three carboxylic acids esterified to glycerol; or, alternatively phrased, glycerol esterified by addition thereto of three carboxylic acids (typically saturated or unsaturated straight chain carboxylic acids having from 2 to 22 carbon atoms). Herein, the terms "triacylglycerols" and "triglycerides" are intended to be interchangeable. In general, oils extracted from any given plant or animal source comprise a mixture of triacylglycerols characteristic of the specific source. The mixture of fatty acids isolated from complete hydrolysis of the triacylglycerols in a specific source are generally referred to as the "fatty acid composition". By the term "fatty acid composition" reference is made to the identifiable fatty acid residues in the various triacylglycerols. The distribution of specific identifiable fatty acids is typically characterized by the amounts of the individual fatty acids as a weight percent of the total mixture of fatty acids isolated from the triacylglycerol stock. The distribution of fatty acids in a particular oil or fat may be readily determined by methods known to those skilled in the art, such as by gas chromatography.

For example, a typical fatty acid composition of soybean oil ("SBO") is as shown in Table I below.

TABLE I

| Typical SBO Fatty Acid Composition | |
|---|---|
| Fatty acid | Weight Percent[1] |
| Palmitic acid | 10.5 |
| Stearic acid | 4.5 |
| Oleic acid | 23.0 |
| Linoleic acid | 53.0 |
| α-Linolenic acid | 7.5 |
| Other | 1.5 |

[1]Weight percent of total fatty acid mixture derived from hydrolysis of soybean oil.

Palmitic and stearic acids are saturated fatty acids and triacylglycerol acyl chains formed by the esterification of either of these acids do not contain any carbon-carbon double bonds. However, many fatty acids such as oleic acid, linoleic acid and α-linolenic acid are unsaturated (i.e., contain one or more carbon-carbon double bonds). Oleic acid is an 18 carbon fatty acid with a single double bond; linoleic acid is an 18 carbon fatty acid with two double bonds or points of unsaturation; and α-linolenic is an 18 carbon fatty acid with three double bonds. More specifically, oleic acid is (Z)-9-octadecanoic acid;

linoleic acid is (Z,Z)-9,12-octadecadienoic acid;

α-linolenic acid is (Z,Z,Z)-9,12,15-octadecatrienoic acid.

The degree of unsaturation of a triacylglycerol stock strongly influences the melting point and fluidity characteristics of the material. One measure of the average number of double bonds present in the triacylglycerol molecules of an unsaturated triacylglycerol stock is its Iodine Value. As referred to herein, the Iodine Value of a triacylglycerol or mixture of triacylglycerols is determined by the Wijs method (A.O.C.S. Cd 1-25). For example, soybean oil typically has an Iodine Value of about 125 to about 135 and a pour point of about 0° C. to about –10° C. Hydrogenation of soybean oil to reduce its Iodine Value to about 90 or less can significantly decrease its fluidity as evidenced by an increase in pour point to about 10° C. to 20° C. or higher.

Hydrogenation reactions which do not totally convert all unsaturated fatty acids, however, tend to produce fatty acids including a trans carbon-carbon double bond via isomerization reactions. This is not always advantageous since concerns have been raised over potential health implications of excessive consumption of fats and/or oils containing "trans fatty acids." As used herein, the term "trans fatty acid" refers to any fatty acid including a trans carbon-carbon double bond. The "trans content" of a triacylglycerol stock is a measure of the overall amount of trans carbon-carbon double bonds in the stock and is defined as the wt. % of trans fatty acids in the fatty acid composition of the stock. The "trans content" of a triacylglycerol stock can be determined using the method described in J.A.O.C.S., 54, 54 (1971) for determining the trans content of a particular triacylglycerol stock. Although the trans content of plastic fats may often run as high as 50%, the fats, oils and other products of the present invention typically include no more than about 30%, preferably no more than about 10% and most preferably no more than about 1% trans content. This may be achieved by partially interesterifying stocks based on naturally occurring fats, oils and/or their partially and fully hydrogenated derivatives.

The fluidity of a material is in part determined by the ability of molecular packing, intermolecular interactions, and molecular weight. In general, increasing branching of a hydrocarbon, especially towards the methyl end, or introducing unsaturation in the chain (cis typically produces a greater effect than trans), increases fluidity since it disrupts packing. By "increase in fluidity" in this context, reference is meant to reduction in "pour point" or "melting point" as well as a decrease in the viscosity at a specified temperature of a triacylglycerol stock in a fluid state. The term "pour point" as used herein refers to the temperature at which the material stops flowing (as measured by ASTM method D 97). Thus pour point is a property which may involve a phase change but generally is based on a change in the viscosity properties of the material. The term "melting point" as used herein refers to the temperature at which a material transforms from a solid to a liquid, i.e., when a phase change involving a heat of fusion occurs. In addition to pour point, the viscosity of a triacylglycerol stock or modified version thereof at room temperature or an elevated temperature (e.g., 40° C.) may be used to characterize its fluidity.

Another measure of the fluidity properties of a triacylglycerol stock is the solid fat content as determined at one or more temperatures. Solid fat content ("SFC") can be determined by Differential Scanning Calorimetry ("DSC") using the method described in generally in Example 1 herein. Fats with lower solid fat contents have a lower viscosity, i.e., are more fluid, than their counterparts with high solid fat contents.

Feedstocks employed in the present interesterification process have generally been neutralized and bleached, and then dried to a very low moisture content before catalyst is introduced and the reaction is started. This is because catalysts lose some of their activity in the presence of water, free fatty acids and hydroperoxides. The triacylglycerol stock may have been processed in other ways prior to interesterification, e.g., via fractionation, hydrogenation, refining, and/or deodorizing. Preferably, the feedstock is a refined, bleached triacylglycerol stock.

In addition, to being generally more suitable and versatile materials for use in producing food and beverage products, the progress of interesterification reactions of triacylglycerol stocks which have been bleached is typically easier to monitor via absorbance. Unbleached oils typically include components which have significant absorption at wavelengths between 300 nm and 600 nm. Such components generally absorb light in the visible range and have different absorption maxima than the reddish brown colored species generated during interesterification. Computerized subtraction techniques may be utilized to determine the spectrum due to the presence of the active interesterification catalyst.

The reddish brown color which typically appears upon initiation of a base catalyzed interesterification (generally within minutes after the addition of the basic catalyst) absorbs at wavelengths of spectra range from about 300 to about 500 nm and has a peak absorption at about 370–380 nm. Interesterification reactions may be conveniently monitored by determining the absorbance of the reaction mixture at one or more selected wavelengths within the range of about 300 to 500 nm. Preferably, interestification is monitored at one or more wavelengths between about 325 and 450 nm and, more preferably, between about 330 and 400 nm. In some instances, the reaction may be monitored by measuring the absorbance at a single wavelength (preferably a wavelength close to the absorption maxima, e.g., about 375 nm). Where a significant degree of background absorbance is present, such as with an unbleached vegetable oil, it may be preferable to monitor a number of different wavelengths or to determine a continuous spectrum over some or all of the 300 to 500 nm range.

The absorbance of a reaction mixture undergoing base catalyzed interesterification may be determined by a number of techniques. One convenient method is to introduce a dual fiber optic spectrometer (e.g., a PCD-1000 dual fiber optic spectrometer available from Ocean Optics, Inc., Dunedin, Fla. directly into the reaction vessel. Another means of measuring the absorbance of the reaction mixture is to employ an optical cell connected to the reaction vessel. For example, the reaction mixture may be pumped through a flow through optical cell connected to the reaction vessel or the vessel may be constructed with a side arm optical cell for monitoring the reaction.

The absorbance observed for a specified catalyst dosage can vary somewhat for the same triacylglycerol stock under differing experimental conditions. While the absorbance is essentially unaffected by reaction temperature or the length of reaction time, the configuration of the reactor, scale of the reaction, the type and rate of mixing, air contact, as well as instrumental response factors due to the method of determining the absorbance can lead to minor but systematic variations in the absorbance measured. The results reported herein, however, establish that for a fixed reaction scale, reactor configuration and reaction conditions the correlation between the degree of partial esterification and absorbance is very reproducible.

Suitable basic catalysts for use in the present interesterification include metal alkoxides (such as alkali metal alkoxides), alkali metals (e.g., sodium metal), alkali metal alloys, and metal hydroxides (such as alkali metal hydroxides). Alkali metal alkoxides such as sodium methoxide, sodium ethoxide, potassium methoxide, and potassium ethoxide are particularly suitable for use as interesterification catalysts. Other examples of materials which are commonly employed as an interesterification catalyst include alkali metal alloys such as sodium/potassium alloy and alkali metal hydroxides. When an alkali metal hydroxide such as sodium hydroxide or potassium hydroxide is used as the catalyst, a small amount of glycerol is also often added to the reaction mixture. This may result in the production of alkoxides derived from glycerol which can also act as a catalyst.

A suitable catalyst for interesterification is added to the resulting mixture, the catalyst is activated and the temperature of the reaction mixture is selected to bring about interesterification at a convenient rate and is then typically maintained substantially constant during the course of the reaction. Base catalyzed interesterification reactions are, in general, carried out at temperatures of about 50° C. to about 150° C. The catalyst selected determines the temperature range in which the reaction is typically carried out. Suitable reaction temperatures for common catalyst systems are listed below.

| | |
|---|---|
| Sodium methoxide | 50–120° C. |
| Metallic sodium | 120–130° C. |
| Sodium hydroxide/glycol | 150° C. |
| Sodium hydroxide/water | 170° C. |

As mentioned above, the presence of water in the reaction medium can lead to inactivation of the catalyst, particularly where the catalyst includes a metal alkoxide, an alkali metal, or an alkali metal alloy. Because of this, the starting triacylglycerol stock is generally thoroughly dried prior to introduction of the basic catalyst, preferably to a moisture content of no more than about 0.04 wt. %, more preferably below about 0.01 wt. %, and most preferably below about 0.005 wt. %. For example, the present interesterification process may be conducted by heating the triacylglycerol stock to at least about 100° C. (e.g., 110–120° C.) under vacuum for at least about an hour to dry the material. To preserve the dryness of the stock and avoid inactivation of the catalyst, the present interesterification reactions are preferably carried out under anhydrous conditions. This may be achieved by running the reaction under vacuum or under a blanket of inert gas (e.g., nitrogen or argon). The triacylglycerol stock is then cooled to the desired reaction temperature and an increment of the basic catalyst is added. After a short period of time (e.g., up to about 60 minutes for reaction temperatures between 50° C. and 100° C.), the absorbance of the resulting mixture is determined and sufficient additional amounts of the catalyst are added to achieve the desired absorbance.

Interesterification may conveniently be carried out in batch vessels of desired capacity. The vessels are generally be fitted with heating/cooling coils, an agitator and a vacuum system. Reaction can be quite rapid and will depend primarily on catalyst loading and reaction temperature. At the end of the reaction period, a quenching solution, typically water or dilute acid, may be added to deactivate the catalyst completely thereby stopping the reaction. After a short settling time the water phase may be separated either by decantation or by centrifugation. The interesterified oil blend is often then re-refined and/or deodorized.

The interesterification reaction may be carried out at a temperature (e.g., 50° C. to 70° C.) which causes the reaction to proceed at a rate permitting its progress to be continuously monitored via absorbance and stopped when a specific desired degree of interesterification is achieved. The reaction may be stopped at the desired point by the addition of a dilute acid quenching solution, such as dilute sulfuric acid or phosphoric acid solution.

The entire reaction may be performed in a single vessel having appropriate means to vary the temperature of the reaction mixture or, alternatively, the catalyst addition and activation may be carried out in a first vessel, the reaction mixture cooled to the desired interesterification temperature by passage through a heat exchanger, for example, a plate heat exchanger and fed to a second vessel where it is maintained at the interesterification temperature. The latter arrangement can provide more rapid cooling of the reaction mixture and can in some instances be used to enhance the development of a solid fat phase during a directed interesterification.

Interesterification may also be carried out continuously. In this case, sodium- or potassium-alloy and/or metallic sodium are often used as the catalyst. The triacylglycerol, stock is typically continuously vacuum-dried to achieve a moisture content below 0.01%. Metallic sodium is introduced into the dry oil stream at a very low level (e.g., no more than about 0.05%) and dispersed using a high-shear mixer. The absorbance of the reaction mixture is monitored using a flow cell. Sufficient residence time is provided in a tubular reactor, after which catalyst may be deactivated with steam, followed by water-washing and centrifugal separation of the mixture.

The degree of interesterification can be measured based on a variety of properties of the triacylglycerol stock. Suitable examples include the amount of a specific triacylglycerol (e.g., tristearin), the solid fat content of the triacylglycerol stock at a given temperature (e.g., at 40° C. (104° F.)), carbon number analysis (i.e., the percentage of triglycerides having a specified number of carbons), and the melting point of the triacylglycerol stock.

As used herein, the term "degree of interesterification" is defined by the formula:

$$(X_t - X_o)/(X_{eq} - X_o) \times 100\%$$

wherein

X is a measurable property depending on the molecular composition of the triacylglycerol stock that reaches its extreme value after randomization of the composition (relative to the value of the measurable property prior to initiation of interesterification);

$X_o$ is the value of X prior to initiation of the interesterification;

$X_{eq}$ is the value of X after interesterification of the triacylglycerol stock to randomization; and $X_t$ is the value of X for the triacylglycerol stock for which the degree of conversion is to be determined.

The terms "fat" and "oil" are used in this specification as synonyms with the term "triacylglycerol stock." Triacylglycerol stocks from which lower melting constituents have been removed will be indicated as "stearin fractions". A stearin fraction for the purpose of this description and claims is defined as a mixture or fat blend from which some of the lower melting constituents (typically at least about 10%) have been removed by of fractionation, e.g., dry fractionation or solvent fractionation. For example, palm oil which has had at least 10% of the lower melting constituents removed via fractionation is referred to as "palm stearin." Similarly, as used herein, an olein fraction is a triacylglycerol stock from which higher melting triacylglycerols have been removed. Typically, an olein fraction is produced by removing at least 5% of the higher melting triacylglycerols from a triacylglycerol stock via a fractionation process.

Crystal fractionation is one common method of modifying a triacylglycerol mixture and can be carried out with and without solvents, with and without agitation. The crystal fractionation can be repeated several times. Crystal fractionation is a particularly effective method of removing higher melting triacylglycerols. Removal of higher melting triacylglycerols can in turn alter the melting profile of the triacylglycerol mixture.

A triacylglycerol stock which is particularly suitable for modification using this process is a triacylglycerol stock which is a blend of a hardstock component and a softstock component. The terms "hardstock" and "hardstock component" refer to triacylglycerol stocks of which a substantial portion and, typically, at least about 40% and often 70% or higher, of the fatty acyl chain are saturated. Hardstocks are typically solid at room temperature. In addition to fully hardened triacylglycerol stocks (i.e., stocks which are essentially completely saturated and have an Iodine Value of no more than about 10), lard and tallow are examples of suitable triacylglycerol stocks which may make up all or a portion of the hardstock component. The degree of saturation of a hardstock can also be characterized in terms of the Iodine Value of the stock. Hardstock components typically have a Iodine Value of no more than about 90 and preferably no more than about 70. For example, lard typically has an Iodine Value of 48–65, while the Iodine Value for tallow ranges from 40–55. Less saturated fractionation products such as lard olein and tallow olein may have Iodine Values as high as 90. Other suitable fats for use in hardstock components include vegetable oil-based triacylglycerol stocks having an Iodine Value of no more than about 90 and preferably no more than about 70 or tropic oils containing high levels of saturated fatty acids (SAFAs). This latter category includes tropic oils such as palm oil and babasu oil.

With respect to the choice of the softstock, lauric fat, liquid oil or a mixture thereof may be used. By lauric fat is meant a fat having a content of lauric acid residues of at least 40%, preferably at least 45%. In practice the lauric fats will be coconut oil or palm kernel oil, although in principle other lauric fats can be used as well. Although the structuring effect of lauric fats may be increased by hardening (e.g., by hydrogenation), and in particular fully hardening before the interesterification, this option is less preferred than using unhardened lauric fats having regard to naturalness and other considerations mentioned herein. For enhancing the structuring effect thereof, in a preferred embodiment, the lauric fats are fractionated and the stearin fraction of those fats as occurring in nature are used in the interesterification.

The term "liquid oil" is used in this specification for glyceride mixtures that are free of solids at 20° C. and preferably at 10° C. Particularly liquid oils containing at least 40% of unsaturated fatty acids (UFA) and in particular of poly-unsaturated fatty acids (PUFA), especially linoleic acid, are of importance. Preferably, the liquid oil is vegetable oil. Specifically, the liquid oil preferably comprises sunflower oil, soybean oil, rapeseed oil, cottonseed oil, groundnut oil, corn oil, safflower oil, canola oil, linseed oil, high oleic acid containing oils (e.g. high oleic sunflower oil, high oleic soybean oil or high oleic rapeseed oil), high stearic and/or palmitic acid containing oils (e.g. high stearic/palmitic sunflower oil, high stearic/palmitic soybean oil or high stearic/palmitic canola oil), or a mixture of two or more of these oils.

One example of a suitable embodiment of the invention is the partial interesterification product of a blend which includes a lauric fat, preferably palm kernel stearin or possibly fully hardened palm kernel oil. The blend also typically includes a hardstock having at least about 65% and preferably more saturated fatty acid residues (SAFA). Most preferred is palm stearin with a high melting point, e.g., from solvent fractionation. As an alternative, e.g., fully hardened palm oil can be used. The resulting fat blend is a particularly suitable for partial interesterification together with high contents of liquid oil for making so-called health spreads.

For certain applications, partial interesterification products can be used as margarine fat without incorporation of liquid oil, e.g., for bakery applications or spreads for tropical countries if no chilled distribution is used. On the other hand, for making soft spreads packed in tubs, very high contents of liquid oil may be desired in the margarine fat. The present partial interesterification method can provide triacylglycerol stocks having a higher liquid oil content than either the fully randomized counterpart or the starting unreacted stock (see e.g., Examples 10–12). This is especially useful for producing plastic fats such shortenings, stick margarines and tub margarines having desirable melting, crystallization and fluidity characteristics while minimizing the trans content of the product (e.g., to less than about 5% trans content). The desired solid fat and liquid oil contents of plastic fats will vary based on their uses. For example, while plastic fats in general have a solid fat content at 40° C. of no more than about 20%, all purpose shortenings preferably have a solid fat content at 40° C. of no more than about 15% and margarines typically have a solid fat content at 40° C. of no more than about 2%.

The present partial interesterification products are useful in a wide variety of food and beverage products. For example, the partial interesterification products can be used in the production of baked goods in any form, such as mixes, shelf-stable baked goods, and frozen baked goods. Possible applications include, but are not limited to, cakes, brownies, muffins, bar cookies, wafers, biscuits, pastries, pies, pie crusts, and cookies, including sandwich cookies and chocolate chip cookies. The baked goods can contain fruit, cream, or other fillings. Other baked good uses include breads and rolls, crackers, pretzels, pancakes, waffles, ice cream cones and cups, yeast-raised baked goods, pizzas and pizza crusts, baked farinaceous snack foods, and other baked salted snacks. In addition to their uses in baked goods, the partial interesterification products can be used alone or in combination with other regular and/or reduced calorie fats and oils to make shortening and oil products. Suitable sources of regular fats and oils include, but are not limited to: 1) vegetable fats and oils such as soybean, corn, sunflower, rapeseed, low erucic acid rapeseed, canola, cottonseed, olive, safflower, and sesame seed; 2) meat fats such as tallow or lard; 3) marine oils; 4) nut fats and oils such as coconut, palm, palm kernel, or peanut; 5) milkfat; 6) cocoa butter and cocoa butter substitutes such as shea, or illipe butter; and 7) synthetic fats. Shortening and oil products include but are not limited to, shortenings, margarines, spreads, butter blends, lards, salad oils, popcorn oils, salad dressings, mayonnaise, and other edible oils.

Representative of fat-containing food products which can contain, in addition to other food ingredients, the present partial interesterification products in full or partial replacement of another natural or synthetic fat are: frozen desserts, e.g., frozen novelties, ice cream, sherbet, ices, and milk shakes; salad dressings; mayonnaises and mustards; dairy and non-dairy cheese spreads; margarine, margarine substitutes and blends; flavored dips; flavored bread or biscuit spreads; filled dairy products such as filled cream and filled milk; frying fats and oils; cocoa butter replacements and blends; candy, especially fatty candies such as those containing peanut butter or chocolate (to which antibloom properties may be imparted); reformed and comminuted meats; meat substitutes and extenders; egg products and substitutes; nut products, such as peanut butter; vegetable and fruit products; pet foods; whipped toppings; compound coatings; coffee lighteners, liquid and dried; puddings and pie fillings; frosting and fillings; chewing gum; breakfast cereals; bakery products, e.g., cakes, breads, rolls, pastries, cookies, biscuits, and savory crackers and mixes or ingredient premixes for any of these. The partial interesterification products of this invention may also be employed in any flavor, nutrient, drug or functional additive delivery system.

The partial interesterification products can also be used in combination with noncaloric or reduced calorie fats, such as branched chain fatty acid triglycerides, triglycerol ethers, polycarboxylic acid esters, sucrose polyethers, neopentyl alcohol esters, silicone oils/siloxanes, and dicarboxylic acid esters. Other partial fat replacements useful in combination with the partial interesterification products are medium chain triglycerides, highly esterified polyglycerol esters, acetin fats, plant sterol esters, polyoxyethylene esters, jojoba esters, mono/diglycerides of fatty acids, and mono/diglycerides of short-chain dibasic acids.

The present partial interesterification products can also be fortified with vitamins and minerals, particularly fat-soluble vitamins. For example, U.S. Pat. No. 5,034,083 (incorporated by reference herein) discloses polyol fatty acid polyesters fortified with fat-soluble vitamins. Examples of suitable fat-soluble vitamins include vitamin A, vitamin D, vitamin E, and vitamin K. The amount of fat-soluble vitamins employed to fortify the present partial interesterification product-containing compositions can vary. If desired, the compositions may be fortified with a recommended daily allowance (RDA), or increment or multiple of an RDA, of any of the fat-soluble vitamins or combinations thereof.

The invention will be further described by reference to the following examples. These examples illustrate but do not limit the scope of the invention that has been set forth herein.

EXAMPLE 1

An oil mixture, prepared from IMC-130 canola oil and fully hydrogenated soybean oil ("S8," Iodine Value<10) at the ratio of 70:30 (w/w), was used as the starting oil mixture. The starting oil mixture contained 6.9% palmitic ("P"), 28.3% stearic ("S"), 54.5% oleic ("O "), 8.3% linoleic ("L") and 1.2% trans acids. Table 1 lists the main triglyceride compositions of stock oils. IMC-130, a high oleic canola oil, contains 85% triunsaturated triglycerides, mainly LOO and OOO. S8 (a fully hydrogenated soybean oil) was determined to contain essentially only PSS and SSS. The IMC-130/S8 oil mixture (70:30) contains 26 % trisaturated triglycerides (PSS and SSS) and has a softening point of 60° C. (140° F.).

TABLE 1

The Triglyceride Compositions of Selected Oils

| Oils** | LnOO | LOO | LOP | OOO | OOP | OOS | PSS | SSS |
|---|---|---|---|---|---|---|---|---|
| IMC-130 | 7.36 | 19.16 | 1.87 | 58.66 | 5.86 | 2.48 | 0.09 | —* |
| S8 | — | — | — | — | — | — | 27.49 | 70.59 |
| 70:30 Mixture | 5.15 | 13.41 | 1.31 | 41.06 | 4.1 | 1.74 | 5.28 | 21.18 |

* - not detected.
** - P - palmitic; 0 - oleic; S - stearic; L - linoleic; Ln - Linolenic.

One hundred grams of the oil mixture was dried at 110–120° C. for 60 min under about 10 mm Hg vacuum and then cooled to the desired experimental temperature (60–120° C.). A controlled amount of freshly prepared sodium methoxide was added under stirring to initiate interesterification. About 1 gram of oil was sampled at various time intervals during the reaction for analyses of melting curves and triglyceride profiles.

The interesterifications were conducted at various temperatures with two levels of catalyst: 0.3% and 0.5% (w/w) of freshly prepared sodium methoxide. The oils were sampled during the reaction and their solid fat contents and triglyceride profiles were measured by differential scanning calorimetry (DSC) and high-performance liquid chromatography (HPLC), respectively.

The solid fat contents were calculated and expressed as the percentage of integrated areas of total melting curves at 10, 21.1, 26.7, 33.3 and 40° C. The solid fat contents (SFCs) at 40° C. were used as the indicator of the progress of interesterification. Similarly, the triglyceride compositions were analyzed by HPLC and calculated by the area percentage of HPLC chromatogram because the calibration indicated that response factors were similar among the various types of triglycerides in the experimental oils. The concentration of tristearin was used to indicate the progress of reaction.

Spectroscopic Analysis and the Progress of Interesterification

A reddish brown color always appears in the reaction mixture upon initiation of interesterification. The ultraviolet and visible spectra of the reaction mixture were studied to quantitate the color change. A PCD-1000 Dual Fiber Optic Spectrometer (Ocean Optics, Inc., Dunedin, Fla., USA) was used as on-line monitor. The peak absorbance developed with a given amount of sodium methoxide during interesterification was determined; solid fat contents and triglyceride compositions of these oils interesterified at certain absorption values were determined to evaluate the degree of interesterification. The effects of time and temperature on the degree of interesterification at the defined absorption values were also studied.

Scaled Partial Interesterification

One kilogram of oil mixture was dried and partially interesterified at a certain peak absorbance. The interesterified oils were evaluated by DSC and HPLC for their solid fat contents and triglyceride profiles. A group of experiments was conducted to test the reproducibility of partial interesterification.

Melting Curves by Differential Scanning Calorimetry (DSC)

About 10 mg of oils were loaded into stainless steel pans. The DSC was programmed as the following and the melting curves from −30 to 70° C. were used to calculate the solid contents. The solid fat contents were calculated by percentage of area at the temperature over the total area.

TABLE 2

DSC Heating and Cooling Program

| Temperature (° C.) | Time (Minute) | Rate (° C./Min) |
|---|---|---|
| 30 | 0 | 50 |
| 75 | 0.5 | 20 |
| −30 | 10 | 10 |
| 70 | — | — |

HPLC

The glyceride profiles were analyzed under the following conditions: Spherisorb C18 column, 15 cm×4.6 mm S3 ODS2; Waters Alliance 2690 pump; ELSD IIA detector (Varex, Md). The mobile phase was a mixture of dichloromethane and acetonitrile at 0.7 mL/min. The peaks were identified by triglyceride standards and oils with known triglyceride compositions. The area percentage was used to quantiate the composition of triglycerides. The column temperature was 40° C.

TABLE 3

| Time (min) | HPLC Solvent Gradient | |
| --- | --- | --- |
| | Dichloromethane | Acetonitrile |
| 0 | 20 | 80 |
| 1 | 30 | 70 |
| 30 | 60 | 40 |
| 31 | 20 | 80 |
| 35 | 20 | 80 |

Intersterification was conducted at various temperatures with 0.3 or 0.5 wt. % sodium methoxide. The lower amount, 0.3 wt. %, represents the commonly used dosage in industrial intersterification reactions and supplies an excess of catalyst to guarantee full randomization in case inactivating factors are present in the reaction mixture. Therefore, 0.5 wt. % sodium methoxide provides an additional excess of catalyst to ensure fast randomization.

Figure 2:
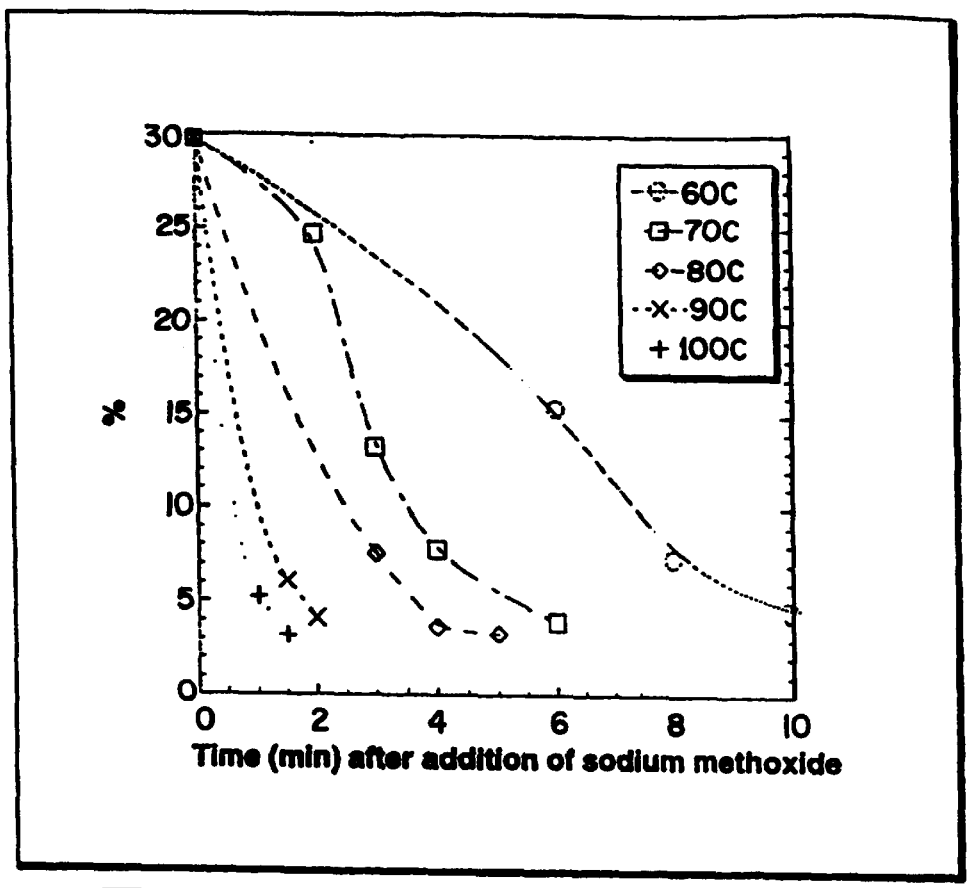
FIG. 2 is a graph showing the rate of interesterification of a triacylglycerol stock as a function of reaction temperature and reaction time as determined by the change of tristearin content (0.5 wt. % NaOMe).
Figure 3:
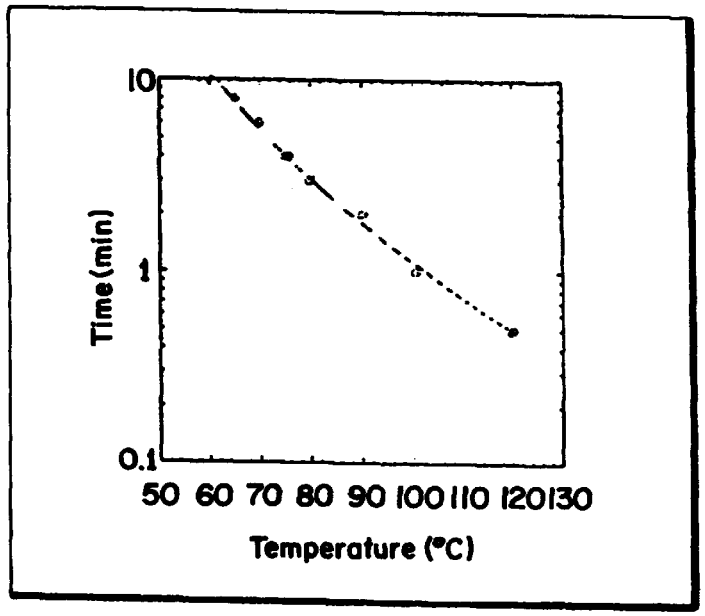
FIG. 3 is a graph of the time required for randomization of a triacylglycerol stock and showing the semilogarithmic relationship between reaction time and temperature.

The rate of interesterification increased with increasing of reaction temperature as determined by solid fat content ("SFC") and tristearin ("SSS") content (FIGS. 1 and 2). The SFC at 40° C. is an indirect measurement of tristearin; therefore, both data have the similar pattern. The time required for randomization ranges from 20 min at 60° C. to 1 min at 100° C. Reation time and temperature have a semilograthmic relationship (FIG. 3). Therefore, increased temperature is effective in reducing the reaction time required to achieve complete randomization.

Figure 4:
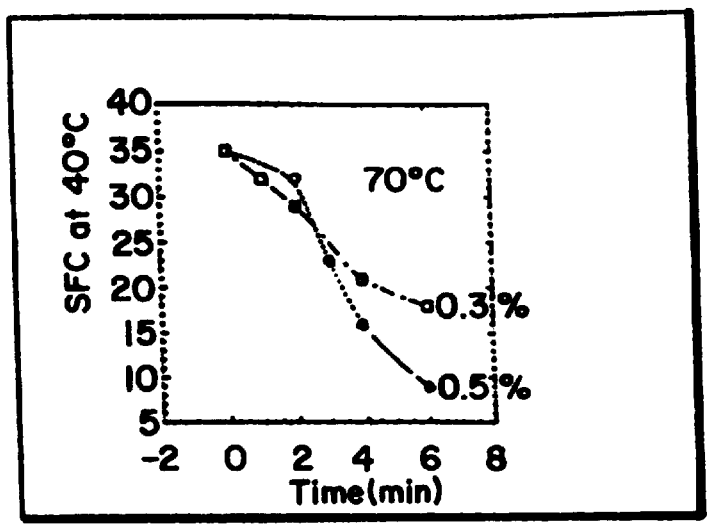
FIG. 4. is a graph showing the effect of catalyst dosage (0.3 and 0.5 wt. % NaOMe) on interesterification of a triacylglycerol stock at 70° C.
Figure 5:
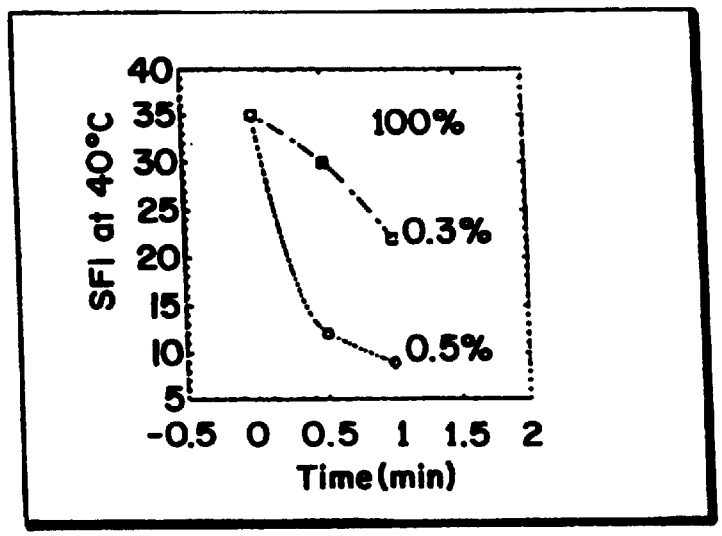
FIG. 5 is a graph showing the effect of catalyst dosage (0.3 and 0.5 wt % NaOMe) on interesterification of a triacylglycerol stock at 100° C.

The rate of interesterification also depends on the amount of sodium methoxide. Interesterification proceeds more slowly at a low dosage than at a high dosage of catalyst (see e.g., FIGS. 4–5). The reaction was only 65% and 50% of complete with 0.3 wt. % NaOMe compared to 100% with 0.5 wt. % NaOMe after 6, 3 and 1 minute at 70° C. and 100° C. With either catalyst dosage, interesterification was faster at the higher temperature.

EXAMPLE 2

Absorption Spectrum and its Utilization

Figure 6:
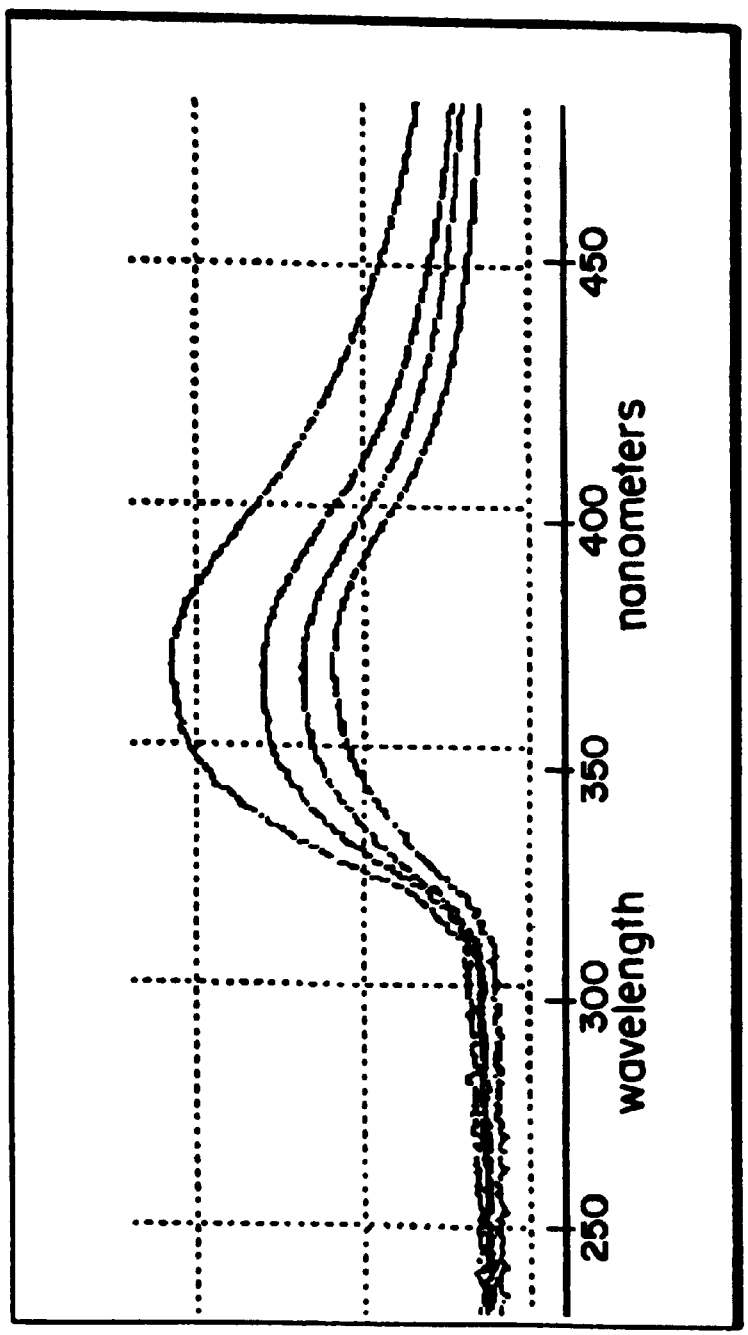
FIG. 6 depicts a typical absorption spectrum of a triacylglycerol stock with 0.1, 0.13, 0.16 and 0.21 wt. % sodium methoxide added.

A reddish brown color always appeared upon initiation of sodium methoxide catalyzed interesterification. It was observed that the color density increased with the dosage of catalyst. The UV/Visible spectra of oils with at various levels of catalyst added were measured—minutes after the addition of sodium methoxide. The wavelengths of spectra range from 300 to 500 nm and show a peak at 374.4 nm as determined by PCD-1000 dual fiber optic spectrometer (FIG. 6). Within this range, the oil will absorb blue light and has a characteristic reddish brown color.

The intensity of color induced was linearly related to the amount of sodium methoxide added to the reaction mixture at 60–120° C. (see FIG. 7). Sodium methoxide is reactive to moisture and acidic chemicals in air and oil, so any change in the environments such as oil quality and drying system efficiency would significantly affect the amount of active sodium methoxide, which then determines the amount of real catalyst in the reaction mixture. The amount of active sodium methoxide is very difficult to be measured in situ; therefore, this technique overcomes this difficulty and provides a measure of the amount of catalyst present.

Interesterifications were then conducted in which the absorbance at 374.4 nm was held constant at various levels (FIG. 8). Initiation of interesterification was observed at absorbencies above 0.4 and randomization occurred in reaction mixtures in which enough catalyst was present to bring the absorbance to above 1.0. This observation provides a technique to monitor interesterification on-line for quality control and to minimize the amount of catalyst employed.

EXAMPLE 3

Effect of Temperature and Reaction Time

Figure 9:
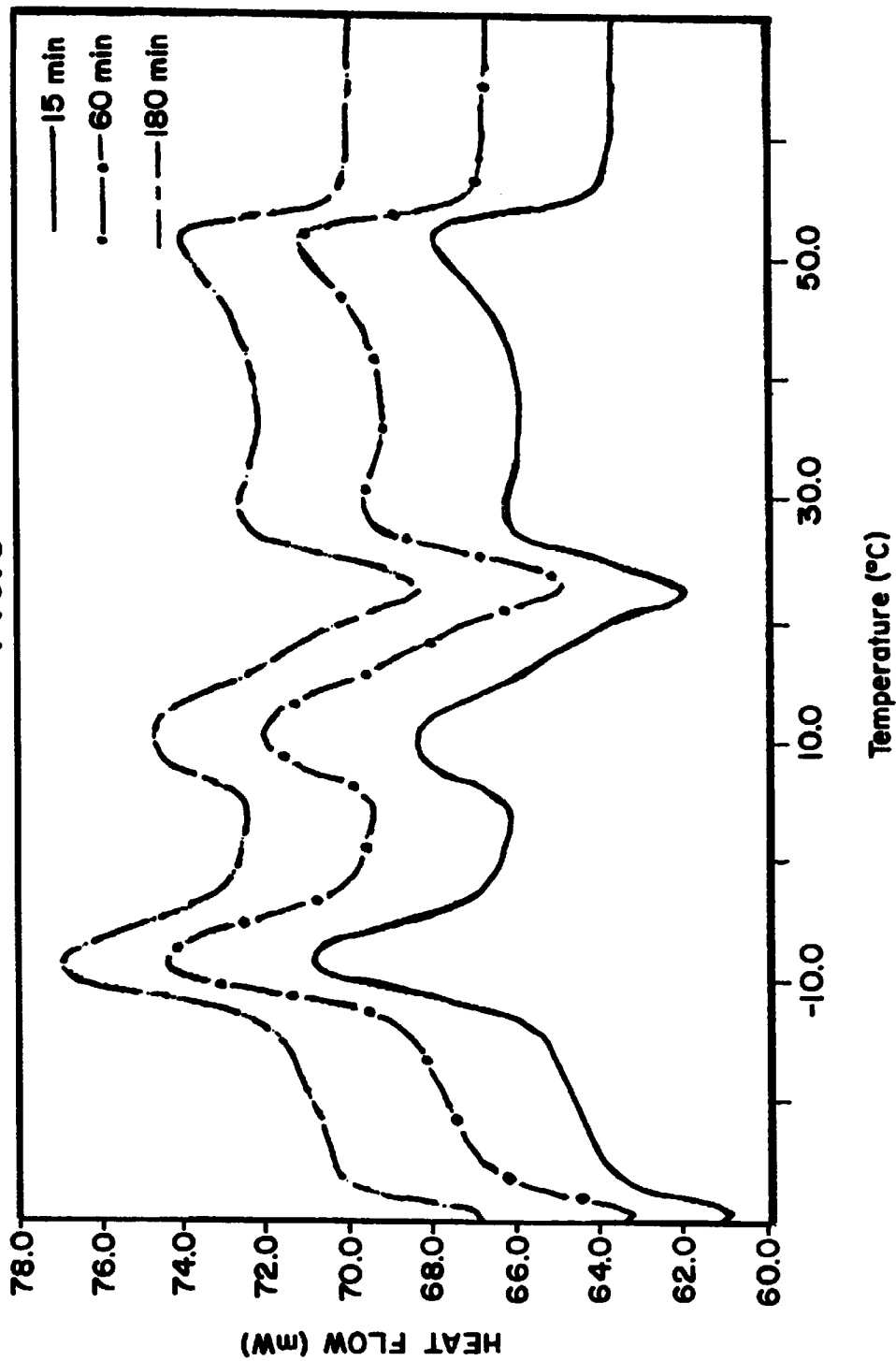
FIG. 9 depicts DSC traces showing the degree of interesterification of a triacylglycerol stock as a function of reaction time for interesterification reaction conducted at 100° C. for 15, 60 and 180 minutes (containing sufficient NaOMe to afford an absorbance of 0.85).
Figure 10:
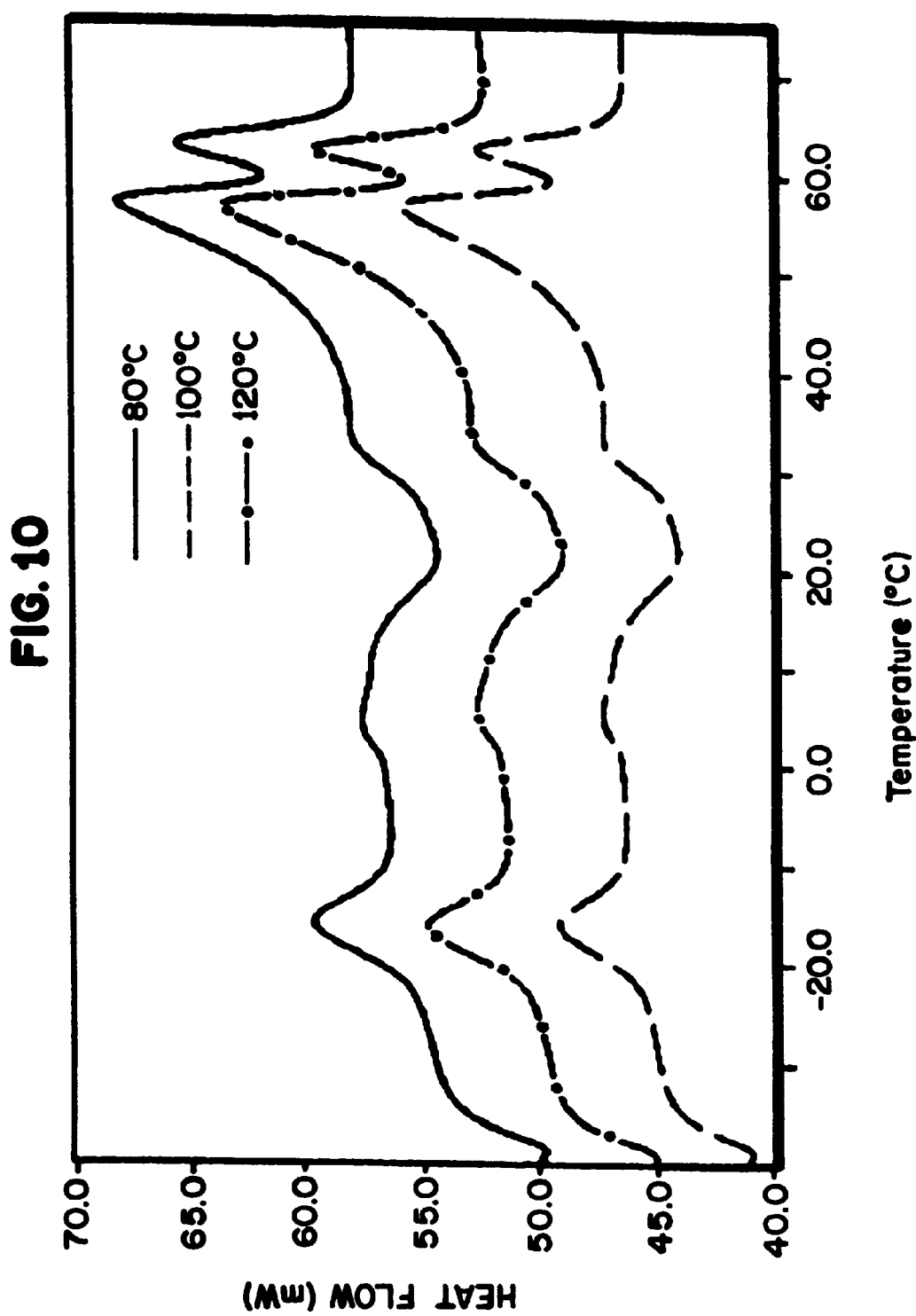
FIG. 10 shows depicts DSC traces showing the degree of interesterification of a triacylglycerol stock as a function of temperature for interesterification reactions run for 30 minutes at 80° C., 100° C. and 120° C. (containing sufficient NaOMe to afford an absorbance of 0.58).
Figure 11:
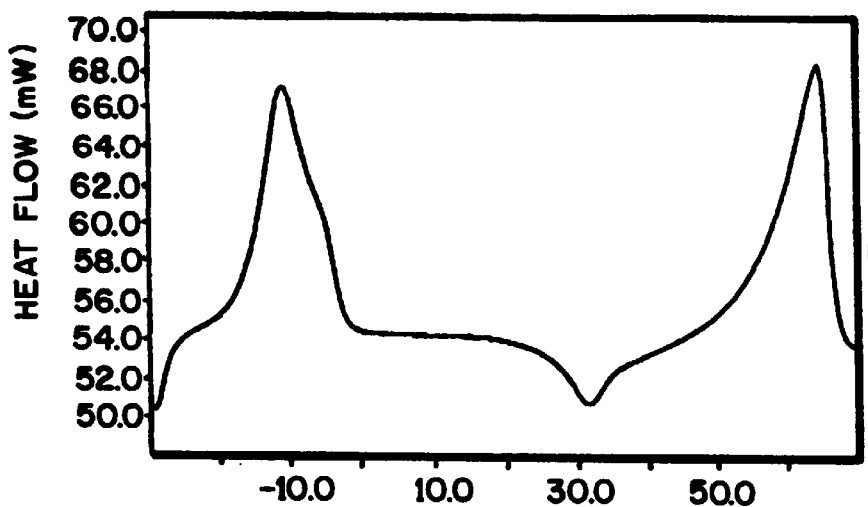
FIG. 11 shows a DSC trace of an unreacted 70:30 IMC-130/S8 oil blend (SFC at 40° C.-35).
Figure 12:
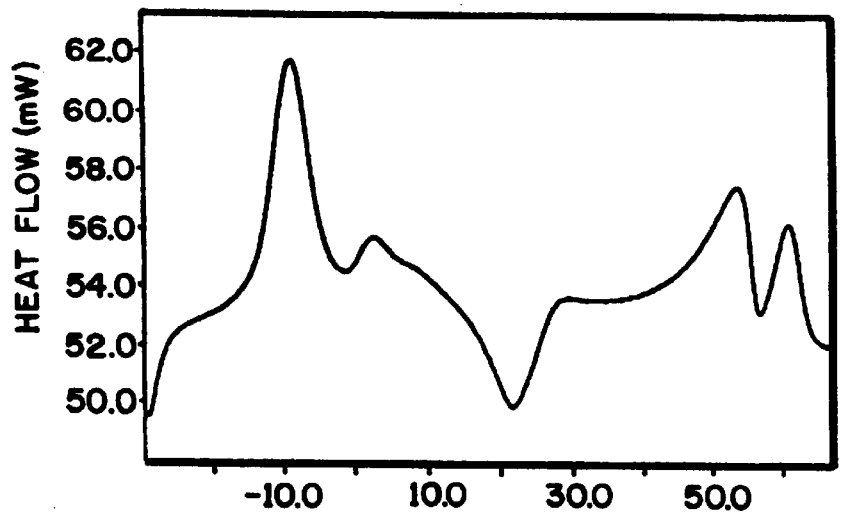
FIG. 12 shows a DSC trace of a 70:30 IMC-130/S8 oil blend after partial interesterification at an absorbance of 0.65 (SFC at 40° C.-26).
Figure 13:
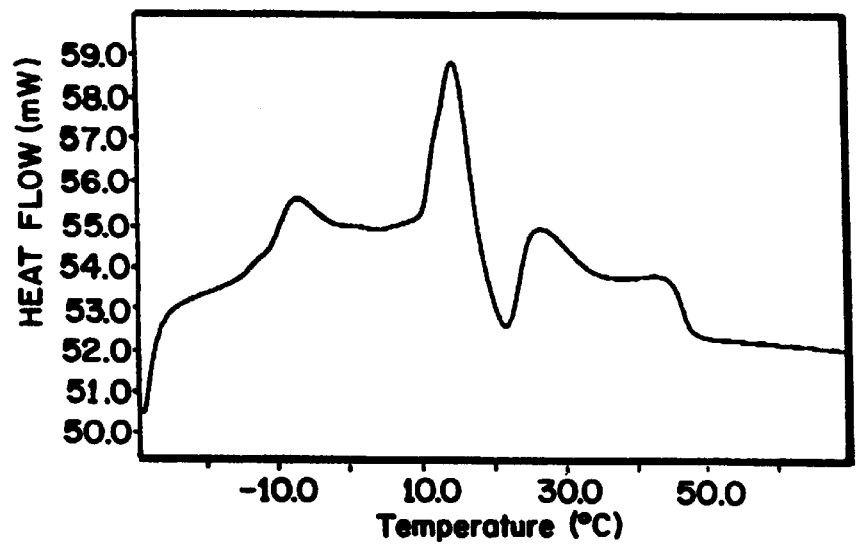
FIG. 13 shows a DSC trace of a 70:30 IMC-130/S8 oil blend after complete randomization (SFC at 40° C.-9).

A series of partially interesterified oils was prepared by controlling oil absorbencies below the peak absorbency of 1.0 (corresponding to the minimum minimum randomization amount of catalyst). The degree of partial interesterification depended on the absorbance and did not change with increased reaction time or temperature (see FIGS. 9 and 10). FIG. 10 shows DSC traces of the 70:30 IMC-130/S8 mixture containing sufficient NaOMe to afford an absorbance of 0.58 after interesterification for 30 minutes at 80° C., 100° C. and 120° C.

EXAMPLE 4

Kilogram Scale Partial Interesterifications

Three separate partial interesterifications were conducted at one kilogram scale by controlling oil absorbencies. The close correspondence of the solid fat contents and triacylglycerol profiles of the three runs (Tests #1–3) indicate that the use of absorbance to monitor partial interesterification is a very reproducible technique (see Table 4 and 5). The absorbances measured for sufficient catalyst to initiate reaction and achieve randmization with the larger scale reaction were slightly different from those observed on a small scale. The experiments demonstrated, however, that when run under the same conditions, the degree of partial interesterification was reproducible for a given set of conditions.

TABLE 4

The SFCs of Oils Interesterified at an Absorbance of 0.9

| | % SFC by DSC | | | | |
| --- | --- | --- | --- | --- | --- |
| Test # | 10° C. | 21.1° C. | 26.7° F. | 33.3° C. | 40° C. |
| 1 | 49 | 28 | 26 | 18 | 12 |
| 2 | 48 | 30 | 28 | 20 | 13 |
| 3 | 46 | 28 | 26 | 19 | 12 |

TABLE 5

Triacylglycerol Profiles of Oils Interesterified at an Absorbance of 0.9

| | SAMPLE | | | | |
| --- | --- | --- | --- | --- | --- |
| TAG | STARTING BLEND | TEST 1 | TEST 2 | TEST 3 | RANDOMIZED |
| LnOO | 3.96 | 3.36 | 3.51 | 3.43 | 1.61 |
| LOO | 11.63 | 9.67 | 9.96 | 9.94 | 5.32 |
| LOP | 1.09 | 1.88 | 1.84 | 1.84 | 2.39 |
| OOO | 45.03 | 36.38 | 37.29 | 38.01 | 17.76 |
| LOS | — | — | — | — | 6.93 |
| OOP | 3.74 | 5.26 | 5.29 | 5.23 | 6.04 |
| OOS | 1.63 | 13.43 | 12.33 | 12.71 | 33.32 |
| OPS | — | 2.12 | 1.87 | 1.94 | 4.52 |
| PPS | — | 0.77 | 0.75 | 0.75 | 0.74 |
| OSS | — | 7.28 | 6.48 | 6.57 | 14.96 |
| PSS | 6.84 | 4.11 | 4.11 | 4.15 | 1.11 |
| SSS | 24.09 | 12.86 | 13.04 | 13.35 | 1.99 |

EXAMPLE 5

Three one hundred gram lots of the 70:30 IMC-130/S8 oil mixture were dried at 110–120° C. for 60 min under about 10 mm Hg vacuum and then cooled to 90° C. Interesterification was conducted at absorbances of 1.0, 1.1 and 1.3 respectively at 374.4 nm for 30 min by adding the proper amount of sodium methoxide under stirring. The reaction was stopped by addition of 10 ml of 1% sulfuric acid. After drying, the oil was sampled for DSC measurement. The solid fat contents at at 10, 21.1, 26.7, 33.3 and 40° C. were determined. The results are listed in Table 6.

TABLE 6

Solid Fat Contents of Interesterified Oil Mixtures

| Sample | Wt. % NaOMe | Absorb. | % SFC by DSC 10° | 21.1° | 26.7° | 33.3° | 40° |
|---|---|---|---|---|---|---|---|
| 0 | 0 | 0 | 42 | 38 | 38 | 37 | 35 |
| 5A | 0.30 | 1 | 47 | 25 | 22 | 15 | 9 |
| 5B | 0.35 | 1.1 | 47 | 25 | 22 | 15 | 9 |
| 5C | 0.5 | 1.3 | 47 | 25 | 22 | 15 | 9 |

EXAMPLE 6

A 100 gram sample of the 70:30 IMC-130/S8 oil mixture was dried at 110–120° C. for 60 min under about 10 mm Hg vacuum and then cooled to 100° C. Interesterification was conducted at an absorbance of 0.75 at 374.4 nm after adding the proper amount of sodium methoxide under stirring. Aliquots were removed after 15, 60 and 180 minutes and each aliquot was quenched by addition of 10 ml of 1% carbonate. After drying, the solid fat contents of each aliquot was determined at at 10, 21.1, 26.7, 33.3 and 40° C. by DSC. The results are listed in Table 7. FIG. 9 shows DSC traces of the 70:30 IMC-130/S8 mixture after interesterification for 15, 60 and 180 minutes and demonstrates that the reaction product was not altered by heating for longer times.

TABLE 7

Solid Fat Contents of Interesterified Oil Mixtures

| Reaction Time | % SFC by DSC 10° | 21.1° | 26.7° | 33.3° | 40° |
|---|---|---|---|---|---|
| 15 min | 45 | 33 | 32 | 24 | 18 |
| 60 min | 45 | 32 | 30 | 23 | 17 |
| 180 min | 45 | 32 | 30 | 23 | 17 |

EXAMPLE 7

Table 8 shows the solid fat contents of samples of a 50:50 mixture of canola oil (Clear Valley 65—"CV65") and a fully hydrogenated soybean oil ("S8"). 100 gram samples were interesterified at 110° C. for 30 minutes following the procedure generally described in Example 5. Sufficient sodium methoxide was added to each sample to achieve the indicated absorbance.

TABLE 8

Interesterified Canola Oil/Hydrogenated Soybean Oil Mixtures

| | | % SFC by DSC | | | | |
|---|---|---|---|---|---|---|
| | Absorb. | 10° C. | 21.1° C. | 26.7° C. | 33.3° C. | 40° C. |
| 7-1 | 0 | 50 | 45 | 45 | 45 | 45 |
| 7-2 | 0.56 | 49 | 46 | 46 | 42 | 40 |
| 7-3 | 0.65 | 51 | 40 | 40 | 37 | 31 |
| 7-4 | 0.76 | 51 | 38 | 38 | 35 | 29 |
| 7-5 | 0.88 | 50 | 33 | 29 | 28 | 21 |
| 7-6 | 0.93 | 51 | 33 | 28 | 27 | 20 |
| 7-7 | 1.01 | 50 | 33 | 28 | 26 | 19 |
| 7-8 | 1.25 | 50 | 32 | 26 | 24 | 18 |

To determine the reproducibility of the correlation between absorbance and the degree of partial interesterification (as determined by % SFC by DSC), additional 100 gram samples were interesterified under the same conditions at an absorbance of about 0.57 (Samples 7-9, 7-10 and 7-11) or 0.78 (Samples 7-12, 7-13 and 7-14). The degree of interesterification (based on % SFC by DSC) observed for these latter samples agrees well with that predicted from the results obtained with samples 7-1 through 7-8 shown in Table 9 below.

TABLE 9

Interesterified Canola Oil/Hydrogenated Soybean Oil Mixtures

| | | % SFC by DSC | | | | |
|---|---|---|---|---|---|---|
| Sample | Asorb. | 50° F. | 70° F. | 80° F. | 90° F. | 104° F. |
| 7-9 | 0.57 | 51 | 44 | 44 | 40 | 36 |
| 7-10 | 0.57 | 51 | 46 | 46 | 42 | 38 |
| 7-11 | 0.57 | 49 | 45 | 45 | 43 | 39 |
| 7-12 | 0.78 | 52 | 37 | 36 | 35 | 28 |
| 7-13 | 0.79 | 51 | 37 | 36 | 35 | 27 |
| 7-14 | 0.78 | 52 | 39 | 39 | 33 | 30 |

EXAMPLE 8

Table 10 shows the solid fat contents of samples of a 50:50 mixture of palm stearin and palm kernel stearin. 100 gram samples were interesterified at 110° C. for 30 minutes following the procedure generally described in Example 5. Sufficient sodium methoxide was added to each sample to achieve the indicated absorbance.

TABLE 10

Interesterified Palm Stearin/Palm Kernel Stearin Mixtures

| | | % SFC by DSC | | | | |
|---|---|---|---|---|---|---|
| Sample | Absorb. | 10° C. | 21.1° C. | 26.7° C. | 33.3° C. | 40° C. |
| 8-1 | 0 | 100 | 81.3 | 56.2 | 20.1 | 4.1 |
| 8-2 | 0.54 | 95 | 76 | 51 | 19 | 0.8 |
| 8-3 | 0.62 | 96 | 79 | 54.7 | 20.9 | 0.8 |
| 8-4 | 0.66 | 93.4 | 76.5 | 52.3 | 19 | 0.3 |
| 8-5 | 0.78 | 92.4 | 76.8 | 53.9 | 20.1 | 0.3 |
| 8-6 | 0.88 | 90.7 | 75.3 | 53.1 | 18.8 | 0.1 |
| 8-7 | 0.98 | 89.9 | 74.3 | 52.3 | 17.8 | 0.1 |
| 8-8 | 1.04 | 89.7 | 73.2 | 50.5 | 15.7 | 0.1 |

To determine the reproducibility of the correlation between absorbance and the degree of partial interesterification (as determined by % SFC by DSC), additional 100 gram samples were interesterified under the same conditions at an absorbance of about 0.8 (Samples 8-9 and 8-10), 0.57 (Samples 8-11 and 8-12) or 0.77 (Samples 7-13 and 7-14). The degree of interesterification (based on % SFC by DSC) observed for these latter samples (shown in Table 11 below) agrees well with that predicted from the results obtained with samples 8-1 through 8-8.

TABLE 11

Interesterified Palm Stearin/Palm Kernel Stearin Mixtures

| | | % SFC by DSC | | | |
|---|---|---|---|---|---|
| Sample | Absorb. | 10° C. | 21.1° C. | 26.7° C. | 33.3° C. | 40° C. |
| 8-9 | 0.8 | 92.1 | 75.4 | 51.3 | 17.3 | 0.1 |
| 8-10 | 0.8 | 92.3 | 76 | 52.3 | 18.2 | 0.1 |
| 8-11 | 0.56 | 96.4 | 76.5 | 50.4 | 17.5 | 0.8 |
| 8-12 | 0.58 | 95.3 | 77.2 | 52 | 18.8 | 0.6 |
| 8-13 | 0.78 | 92.4 | 76.8 | 53.9 | 20.1 | 0.3 |
| 8-14 | 0.76 | 94.5 | 78.1 | 53.8 | 20.1 | 0.3 |

EXAMPLE 9

Table 12 shows the solid fat contents of samples of a 50:50 mixture of palm stearin and CV65 canola oil. 100 gram samples were interesterified at 110° C. for 30 minutes following the procedure generally described in Example 5. Sufficient sodium methoxide was added to each sample to achieve the indicated absorbance.

TABLE 12

Interesterified Palm Stearin/ Canola Oil Mixtures

| | | % SFC by DSC | | | |
|---|---|---|---|---|---|
| Sample | Absorb. | 10° C. | 21.1° C. | 26.7° C. | 33.3° C. | 40° C. |
| 9-1 | 0 | 46 | 37.1 | 28.4 | 18.4 | 7.2 |
| 9-2 | 0.54 | 43.2 | 33.6 | 24.5 | 14.6 | 3.6 |
| 9-3 | 0.76 | 43.1 | 30.3 | 21.1 | 11.5 | 1.5 |
| 9-4 | 0.86 | 42.6 | 23.8 | 14.8 | 6 | 0 |
| 9-5 | 0.96 | 41.5 | 20.4 | 11.6 | 3.5 | 0 |
| 9-6 | 0.98 | 40.9 | 19.8 | 11.1 | 3.1 | 0 |
| 9-7 | 1.01 | 40.9 | 19.9 | 11.2 | 3.2 | 0 |

To determine the reproducibility of the correlation between absorbance and the degree of partial interesterification (as determined by % SFC by DSC), additional 100 gram samples were interesterified under the same conditions at an absorbance of 0.86-0.89 (Samples 9-8 and 9-9). The degree of interesterification (based on % SFC by DSC) observed for these latter samples (shown in Table 13 below) agrees well with that predicted from the results obtained with samples 9-1 through 9-7.

TABLE 13

Interesterified Palm Stearin/ Canola Oil Mixtures

| | | % SFC by DSC | | | |
|---|---|---|---|---|---|
| Sample | Absorb. | 10° C. | 21.1° C. | 26.7° C. | 33.3° C. | 40° C. |
| 9-8 | 0.89 | 42.8 | 23.8 | 14.7 | 5.9 | 0.1 |
| 9-9 | 0.86 | 42.6 | 23.8 | 14.8 | 6 | 0 |

EXAMPLE 10

Table 14 shows the solid fat contents (as % determined by DSC) of a number of commercial fats. Examples of stick margarine, soft spread tub margarine and shortening are included.

TABLE 14

Solid Fat Contents of Commercial Fats

| | % SFC by DSC | | | | |
|---|---|---|---|---|---|
| Product | 10° C. | 21.1° C. | 26.7° C. | 33.3° C. | 40° C. |
| Soft Margarine* | 50.2 | 30.7 | 18.1 | 5.2 | 0 |
| Stick Margarine (Imperial ™) | 71.5 | 42.7 | 23.5 | 5.4 | 0.1 |
| Crisco All Vegetable Shortening | 55 | 50 | 41 | 31 | 18 |
| Cargill All Purpose Shortening | 57.2 | 44 | 34 | 24 | 14.5 |

*I Can't Believe It's Not Butter ™ Tub Spread

Commercial All Purpose Shortenings such as the two listed in Table 14 typically have trans contents on the order of 30–40%. To explore the potential of interesterification to permit the production of lower trans content shortenings, two very low trans content shortenings (<4% trans content) were prepared. Sample 10-1 was an 85:15 mixture of the 0.88 absorbance partially interesterified oil stock described in Example 7 ("7-5 Basestock") and palm kernel oil. Sample 10-2 was an 78:22 mixture of (i) a completely interesterified mixture of canola oil and palm kernel oil described in Example 7 ("7-8 Basestock") and (ii) palm kernel oil. The total liquid oil portion of the blend containing the partially interesterified stock was 9% higher than the formulation based on a completely interesterified stock and thus has a lower total saturate content while still achieving the desired solid fat content profile.

TABLE 15

All Purpose Shortenings

| | % SFC by DSC | | | | |
|---|---|---|---|---|---|
| Product | 10° C. | 21.1° C. | 26.7° C. | 33.3° C. | 40° C. |
| Crisco ™ | 55 | 50 | 41 | 31 | 18 |
| Cargill All Purpose | 57.2 | 44 | 34 | 24 | 14.5 |
| 10-1 | 58 | 43 | 37 | 25 | 18 |
| 10-2 | 60 | 46 | 38 | 22 | 14 |
| 7-5 Basestock | 50 | 33 | 29 | 28 | 21 |
| 7-8 Basestock | 50 | 32 | 26 | 24 | 18 |

EXAMPLE 11

Commercial soft spread margarines, such as the example listed in Table 16, typically have trans contents on the order of 8–15%. To explore the potential of interesterification to permit the production of lower trans content soft spread margarines, two very low trans content soft spread margarines (<4% trans content) were prepared. Sample 11-1 was an 90:5:5 mixture of (i) the 0.86 absorbance partially interesterified oil stock described in Example 9 ("9-4 Basestock"), (ii) palm kernel oil, and (iii) palm kernel stearin. Sample 11-2 was an 80:10:10 mixture of a completely interesterified 50:50 CV65 canola oil/palm stearin oil blend stock described in Example 9 ("9-7 Basestock"), (ii) palm kernel oil, and (iii) palm kernel stearin. The blend containing the partially interesterified stock (11-1) had 12.5% more liquid oil than the formulation based on a completely interesterified stock (11-2) and thus has a lower total saturate content while still achieving the desired solid fat content profile.

TABLE 16

Soft Spread Margarines

| Product | % SFC by DSC | | | | |
|---|---|---|---|---|---|
| | 10° C. | 21.1° C. | 26.7° C. | 33.3° C. | 40° C. |
| Comm'l Spread | 50 | 31 | 18 | 5 | 0 |
| Ex 11-1 | 48 | 29 | 19 | 6.5 | 0 |
| Ex 11-2 | 52 | 33 | 20 | 5 | 0 |
| 9-4 Basestock | 42.6 | 23.8 | 14.8 | 6 | 0 |
| 9-7 Basestock | 40.9 | 19.9 | 11.2 | 3.2 | 0 |

EXAMPLE 12

Commercial stick margarines, such as Imperial™ margarine, typically have trans contents on the order of 20–30%. To explore the potential of interesterification to permit the production of lower trans content stick margarine, two very low trans content stick margarines (<4% trans content) were prepared. Sample 12-1 was an 30:35:35 mixture of (i) CV65 canola oil, (ii) the 0.56 absorbance partially interesterified oil stock described in Example 8 ("8-11 Basestock"), and (iii) coconut oil. Sample 12-2 was an 25:25:50 mixture of (i) CV65 canola oil, (ii) palm kernel oil, and (iii) a completely interesterified 50:50 blend palm kernel oil and palm kernel stearin. The blend containing the partially interesterified stock (12-1) had 20% more liquid oil than the formulation based on a completely interesterified stock (12-2) and thus has a lower total saturate content while still achieving the desired solid fat content profile.

TABLE 17

Stick Margarines

| Product | % SFC by DSC | | | | |
|---|---|---|---|---|---|
| | 10° C. | 21.1° C. | 26.7° C. | 33.3° C. | 40° C. |
| Imperial ™ | 71 | 43 | 24 | 5 | 0 |
| 12-1 | 69 | 47 | 24 | 6 | 0.3 |
| 12-2 | 70 | 49 | 23 | 5 | 0 |
| 8-11 Basestock | 96.4 | 76.5 | 50.4 | 17.5 | 0.8 |

EXAMPLE 13

Table 18 shows the solid fat contents (as % determined by DSC) of a number of stock oils. Examples of hardstock, liquid oil and lauric fat are included.

TABLE 18

| Oil | % SFC by DSC | | | | |
|---|---|---|---|---|---|
| | 10° C. | 21.1° C. | 26.7° C. | 33.3° C. | 40° C. |
| Coconut Oil | 100 | 57 | 4 | 0 | 0 |
| CV65 Canola Oil | 0 | 0 | 0 | 0 | 0 |
| S8 Hydrogenated Soybean Oil | 100 | 100 | 100 | 100 | 100 |

TABLE 18-continued

| Oil | % SFC by DSC | | | | |
|---|---|---|---|---|---|
| | 10° C. | 21.1° C. | 26.7° C. | 33.3° C. | 40° C. |
| Palm Oil | 33 | 32 | 22 | 11 | 1 |
| Palm Stearin | 53 | 53 | 53 | 43 | 28 |
| Palm Kernel Oil | 96 | 60 | 18 | 0 | 0 |
| Palm Kernel Stearin | 99 | 97 | 91 | 22 | 0 |
| Palm Kernel Olein | 88 | 32 | 1 | 0 | 0 |

The invention has been described with reference to various specific and preferred embodiments and techniques. The invention is not to be construed, however, as limited to the specific embodiments disclosed in the specification. It should be understood that many variations and modifications may be made while remaining within the spirit and scope of the invention.

What is claimed is:

1. A method of quantitatively monitoring an interesterification reaction of a triacylglycerol stock comprising;
   forming an interesterification mixture including a triacylglycerol stock and a basic catalyst; and
   determining an absorbance of the interesterification mixture at one or more selected wavelengths within a range of greater than about 300 nm and within the uv spectrum.

2. The method of claim 1 wherein the basic catalyst comprises alkali metal alkoxide, alkali metal, alkali metal alloy, or alkali metal hydroxide.

3. The method of claim 2 wherein the alkali metal alkoxide comprises sodium methoxide, sodium ethoxide, potassium methoxide, potassium ethoxide, or a mixture thereof.

4. The method of claim 1 comprising determining the absorbance after heating the interesterification mixture for a sufficient time so that a measurable property of the mixture no longer changes with further heating, wherein the measurable property is selected from the group consisting of an amount of a specific triacylglycerol in the interesterification mixture, a solid fat content of the interesterification mixture at a given temperature, a percentage of triglycerides in the interesterification mixture having a specified number of carbons, or a melting point of the interesterification mixture.

5. The method of claim 1 wherein the triacylglycerol stock comprises a bleached triacylglycerol stock.

6. The method of claim 5 wherein the bleached triacylglycerol stock comprises a refined, bleached triacylglycerol stock.

7. The method of claim 1 wherein the an interesterification mixture includes a triacylglycerol stock which has been subjected to at least one modification process from the group consisting of refining, bleaching, deodorizing, fractionation and hydrogenation.

8. A method of quantitatively monitoring an interesterification reaction according to claim 1 wherein said determining the absorbance is done with a dual fiber optic spectrometer.

9. A process for modifying a triacylglycerol stock comprising:
   forming a mixture including the triacylglycerol stock and a basic catalyst; reacting the mixture to form a partial interesterification product; and determining an absorbance of the reacting mixture at one or more selected wavelengths within a range of greater than about 300 nm and within the uv spectrum.

10. The process of claim 9 further comprising adding a quenching solution to the reacting mixture, thereby stopping the reaction.

11. The process of claim 9 wherein the triacylglycerol stock is a blend comprising a hardstock component and a softstock component.

12. The process of claim 11 wherein the hardstock component comprises a saturated fatty acid stock.

13. The process of claim 11 wherein the hardstock component comprises a hard triacylglycerol stock having an Iodine Value of no more than about 70.

14. The process of claim 11 wherein the softstock component includes a liquid oil, a lauric fat or a mixture thereof.

15. The process of claim 14 wherein the liquid oil comprises soybean oil, corn oil, rapeseed oil, sunflower oil, safflower oil, canola oil, cottonseed oil or a mixture thereof.

16. The process of claim 14 wherein the lauric fat comprises palm kernel oil, coconut oil or a mixture thereof.

17. The process of claim 9 wherein the triacylglycerol stock has a trans content of no more than about 30%.

18. The process of claim 9 wherein the partial interesterification product has a solid fat content at 40° C. of no more than about 30%.

19. The process of claim 9 comprising partially interesterifying the mixture at a temperature of about 50° C. to about 150° C.

20. The process of claim 9 comprising partially interesterifying the mixture under substantially anhydrous conditions.

21. The process of claim 9 comprising partially interesterifying a mixture of the triacylglycerol stock and a sufficient amount of the basic catalyst to form a partial interesterification product having a degree of interesterification of about 5% to about 95%.

22. The method of claim 9 comprising reacting the mixture at a temperature of about 50° C. to about 150° C. to form the partial interesterification product.

23. The method of claim 9 comprising reacting the mixture to form a partial interesterification product having a degree of interesterification of about 20% to about 80%.

24. A process for modifying a triacylglycerol stock according to claim 9 wherein said determining the absorbance is done with a dual fiber optic spectrometer.

25. A method of quantitatively determining the minimum randomization amount of a basic catalyst required to completely interesterify a triacylglycerol stock comprising the steps of:
  (A) adding a first amount of the basic catalyst to a sample of the triacylglycerol stock to form a first catalyzed stock;
  (B) allowing the first catalyzed stock to undergo an interesterification reaction until a measurable property of the triacylglycerol stock attains a constant value, wherein the measurable property is selected from the group consisting of an amount of a specific triacylglycerol in the interesterification mixture, a solid fat content of the interesterification mixture at a given temperature, percentage of triglycerides in the interesterification mixture having a specified number of carbons, or a melting point of the interesterification mixture; and
  (C) determining an absorbance of the first catalyzed stock at one or more selected wavelengths within a range of greater than about 300 nm and within the uv spectrum after the measurable property has attained the first constant value;
  (D) adding a second amount of the basic catalyst to a sample of the triacylglycerol stock to form a second catalyzed stock;
  (E) allowing the second catalyzed stock to undergo an interesterification reaction until the measurable property of the triacylglycerol stock attains a second constant value; and
  (F) determining an absorbance of the second catalyzed stock at one or more selected wavelengths within a range of greater than about 300 nm and within the uv spectrum after the measurable property has attained the second constant value.

26. The method of claim 25 further comprising repeating steps (D)–(F) until the measurable property of a subsequent catalyzed stock no longer varies by more than about 5% upon further heating the composition for a period of up to about 1.0 hour at 50° C. to 200° C.

27. A method of quantitatively determining the minimum randomization amount of a basic catalyst required to completely interesterify a triacylglycerol stock according to claim 25 wherein said determining the absorbance is done with a dual fiber optic spectrometer.

28. A process for modifying a triacylglycerol stock comprising:
  forming a mixture including the triacylglycerol stock and a basic catalyst, wherein the triacylglycerol stock includes a hardstock component and a softstock component;
  reacting the mixture at a temperature within the range of about 50° C. to about 170° C. to form a reaction product; and monitoring an absorbance of the reacting mixture at one or more selected wavelengths within a range of greater than about 300 nm and within the uv spectrum.

29. The method of claim 28 wherein the reacting step comprises reacting the mixture to form a partial interesterification product.

30. A process for modifying a triacylglycerol stock according to claim 28 wherein said determining the absorbance is done with a dual fiber optic spectrometer.

* * * * *